United States Patent
Statnic

[19]

[11] Patent Number: 5,962,987
[45] Date of Patent: Oct. 5, 1999

[54] OPERATING CIRCUIT FOR AN ELECTRODELESS LOW-PRESSURE DISCHARGE LAMP

[75] Inventor: Eugen Statnic, Munich, Germany

[73] Assignee: Patent-Treuhand-Gesellschaft fuer elektrische Gluehlampen mbH, Munich, Germany

[21] Appl. No.: 08/975,623

[22] Filed: Nov. 21, 1997

[30] Foreign Application Priority Data

Dec. 3, 1996 [DE] Germany ............... 196 50 110

[51] Int. Cl.⁶ ........................................ H05B 37/02
[52] U.S. Cl. .................... 315/248; 315/307; 315/219
[58] Field of Search .................... 315/248, 307, 315/283, 276, 224, 209 R, 297, 219

[56] References Cited

U.S. PATENT DOCUMENTS

| | | | |
|---|---|---|---|
| 5,446,350 | 8/1995 | El-Hamamsy et al. | 315/248 |
| 5,550,438 | 8/1996 | Reijnaerts | 315/224 |
| 5,680,015 | 10/1997 | Bernitz et al. | 315/307 |
| 5,691,606 | 11/1997 | Moisin et al. | 315/307 |
| 5,712,771 | 1/1998 | Fitter et al. | 315/307 |
| 5,761,056 | 6/1998 | Noh | 315/307 |

FOREIGN PATENT DOCUMENTS

PCT/EP96/ 03180  3/1997  WIPO.

*Primary Examiner*—Don Wong
*Assistant Examiner*—Wilson Lee
*Attorney, Agent, or Firm*—Carlo S. Bessone

[57] ABSTRACT

The invention relates to an operating circuit for an electrodeless low-pressure gas discharge lamp designed for power between some watts and some kilowatts having a switching system which operates at high frequency in a freewheeling mode close to resonance.

8 Claims, 2 Drawing Sheets

OPERATING CIRCUIT FOR AN ELECTRODELESS LOW-PRESSURE DISCHARGE LAMP

FIELD OF THE INVENTION

The present invention relates to an operating circuit for an electrodeless low-pressure gas discharge lamp.

BACKGROUND OF THE INVENTION

Low-pressure gas discharge lamps have been widespread for decades, and there is a correspondingly large number of known operating circuits for such lamps. The invention proceeds in this case from a known operating circuit for operating a low-pressure gas discharge lamp, having a load circuit which applies radio-frequency power to the lamp, a high-frequency power generator for operating the load circuit, and a drive circuit for driving the high-frequency power generator. The high-frequency power generator is a part of an electronic ballast suitable for operation of electrodeless lamps.

Electrodeless low-pressure gas discharge lamps are an important and novel technical development. Here, the voltage or power required to ignite and maintain the discharge plasma is coupled into the discharge gas without electrodes fitted in the lamp bulb. This can be performed, in particular, by a coil on a closed ferrite core which encloses part of the lamp bulb and thus couples an induced voltage into the discharge gas. Further technical details relating to the electrodeless low-pressure gas discharge lamp follow from the Patent Application PCT/EP96/03180 of the same applicant, the disclosed content of which is expressly included in the present application.

SUMMARY OF THE INVENTION

The invention proceeds from the technical problem that the novel electrodeless low-pressure gas discharge lamps cannot be operated using known operating circuits.

The operating circuit according to the invention is characterized in that the circuit is designed for operating an electrodeless low-pressure gas discharge lamp and has a power switching system which operates in a self-oscillating mode close to resonance and contains the load circuit with the lamp and the drive circuit.

The circuit which operates in a self-oscillating and freewheeling mode close to a resonant frequency permits a substantially "softer" operation compared with conventional circuits, in particular ones with IC square-wave drive of a power generator. This means that the voltage and current-time characteristics, particularly of the drive circuit, are substantially closer to the sinusoidal shape.

This "soft sinusoidal" mode of operation leads to substantially lower losses in the circuit. This relates, in particular, to the switching losses of the switching element or elements of the high-frequency power generator, but also to magnetization losses in the coupler ferrite cores. A further benefit is the low harmonic content for the electromagnetic compatibility, specifically with respect to the line conducted interferences, on the one hand, and also with respect to the lamp field radiation, on the other hand.

The described advantages of operating close to resonance gain in importance in view of the fact that in accordance with the invention the novel circuit is to be designed, in particular, for substantially higher frequencies concerning the ignition and continuous operation of the lamps than is known from conventional circuits working usually at 20 to 50 kHz. In the case of the inductive coupling of the radio-frequency power into the discharge, the higher frequencies are advantageous because the induced voltage is linearly proportional to the frequency. This is particularly important, because the omission of the electrodes also eliminates the conventional possibilities of accomplishing adequate preionization by thermionic emission of coated electrodes (which lowers the electron work function by preheating the electrodes). The preionization leads to a substantial reduction in the critical field strength neccessary for igniting a plasma.

The increased operating frequencies are preferably above 70 kHz, over 200 kHz being better. A plurality of operating frequencies are involved here, because in general in the case of changes in the outer or inner parameters of the discharge in conjunction with a variable temperature, variations in the operating frequency can occur owing to differences between ignition and normal steady-state operation, on the one hand, and owing to frequency changes described further below, on the other hand.

Higher operating frequencies can render it necessary to use faster transistors, such as field-effect transistors, in particular MOS-FETs, instead of the conventionally used bipolar power transistors, for the switching element or elements in the high-frequency power generator. In order to keep the transistor losses within acceptable limits, the bipolar transistors are operated in the saturation region, the result being the charge carrier storage with a relatively long recombination time which is characteristic for bipolar components. The recombination time or storage time can contrast with an increase in frequency.

This disadvantage is avoided by field-effect transistors, but the latter require a substantially higher voltage level for driving (the threshold voltage is approximately 4 V for MOS-FETs by contrast with 0.7 V for silicon bipolar transistors). Moreover, in default of detectable charge carrier storage of the unipolar transistors, a voltage level above the threshold must be maintained over the entire desired turn-on time. In accordance with the invention, the required gate voltage is generated by exciting a circuit tuned close to resonance in order to drive a field-effect transistor gate. The required temporal length of the voltage, which exceeds the gate threshold voltage, can be set by the amplitude of the resonance voltage. Thus, at a higher amplitude, the sinusoidal gate voltage is situated for a correspondingly longer time above the threshold value of the gate voltage. The "on time" is longer and correspondingly the frequency is lower. With a lower gate voltage amplitude, the resulting on time will be shorter and the frequency correspondingly higher.

A further refinement of the invention relates to the use of a transformer with a ferrite core in the drive circuit which excites the resonant circuit supplying the described gate drive voltage. It is essential in this case to operate the transformer core in the linear B-H (non-saturation) region, in order to avoid distortions in the gate sinusoidal voltage and undesired losses. The distortions can counteract the "soft", that is to say nearly sinusoidal, mode of operation of the switching system according to the invention. Moreover, they can lead to disadvantageous distortions in the gate drive voltage, and this can influence the duration of the turn-on time. In particular, the reduction in inductance associated with the saturation can cause undesirable spikes on the voltage waveform before the threshold crossing instants, and disturb the normal operation of the MOS-FET transistor.

Another advantage of the gate sinusoidal drive consists in that a very small gate charge, that is to say a little energy is stored in the transistor immediately before the latter is turned off, and this leads to a very fast drop in drain current and thus to very small turn-off losses.

In order to obtain a switching system which is freewheeling and close to resonance overall, the energy for the drive circuit is advantageously drawn from the load circuit. Since, by contrast with the bipolar transistors, the field-effect transistors require, rather, a voltage drive at a lower power, the invention envisages in a further development tapping a small exciting current from the load circuit, for example by means of an injection capacitor which taps the lamp voltage. This also has the advantage of eliminating the core loss problems, which are very critical in the case of conventional, saturated current transformers where the entire load current flows into the primary coil and saturates the core, even a larger core size.

With regard to the wiring up of the load circuit itself, it is provided, in particular, in accordance with the invention to select a series-parallel configuration. In accordance therewith, a series resonant circuit is combined with a branch, connected in parallel with a part of the resonant circuit, in which branch a coupling coil with a suitable ferrite core which applies radio-frequency power to the lamp is connected. Before the ignition, this parallel part is damped by the equivalent core loss resistance, and the series circuit can supply a very high resonance voltage typical for series resonant circuits, in order to generate the required ignition voltage. This ignition voltage is tapped via the parallel part and coupled inductively into the discharge. After ignition, the series resonant circuit is strongly damped by the transformed resistance of the plasma discharge and advantageously serves to limit the current in the lamp (important because of the typical negative differential resistance of the low-pressure gas discharge).

The current-limiting coil in the series resonant circuit, normally termed a lamp inductor, is essentially connected in parallel in terms of radio frequency with the parallel lamp coil in the operating state. Above all, when, in addition, the inductance of the current-limiting coil is smaller than that of the lamp coil, the result is a substantial reduction in the influence of variations of the lamp coil inductance on the equivalent inductance of the said series-parallel circuit, and thus on the resonant frequency of the series-parallel arrangement.

This is advantageous because, for example, core temperature variations of the lamp coil due to temperature and due to core heating up caused by the lamp, and the like have a very strong effect on the magnetic properties (initial and amplitude permeability) and thus on the inductance of the lamp coil. The resulting frequency detuning can lead to operating problems, chiefly in the case of fixed-frequency driving. For example, it can happen that the lamp can no longer be ignited in the case of particularly low or particularly high temperatures, because the resonant frequency of the arrangement is too far removed from the operating frequency of the generator. This is counteracted by the effect described of parallel connection with the current-limiting coil with a smaller inductance in the series resonant circuit. The influence of temperature variations on the lamp coil is also so decisive because, by contrast with the gapped lamp inductor, the coupling ferrite core is gapless, that is to say a core having the smallest possible air gap (in the micrometer range), should be used here, in order to increase the coupling efficiency.

Moreover, or as an alternative, the whole arrangement of load circuit, drive circuit and frequency generator can be designed so that a frequency shift in the load circuit is automatically counteracted by the inherent built-in "feedback loop". For example, an unusually low temperature of the lamp coil core, and thus a very low inductance can lead to an increased resonant frequency of the load circuit, and thus to an increased operating frequency of the freewheeling circuit system according to the invention. The higher induced voltage associated therewith in the low-pressure gas discharge lamp leads to a power reduction characteristic of such lamps and to a correspondingly higher discharge voltage. A linear rise in the gate driving voltage amplitude of the switching transistors in the power generator corresponds to a higher discharge voltage and leads to a longer turn-on time of the switching transistors. This longer turn-on time reduces the operating frequency of the power generator, and thus correspondingly increases the lamp power. The result overall is that the entire system acts in a self-stabilizing mode which is characteristic for the freewheeling resonance drive according to the invention.

On the other hand, a lamp power increase is associated with decrease of the lamp voltage, and consequently of the gate driving voltage amplitude. A lower gate voltage determines a higher operating frequency, reducing correspondingly the lamp power by the effect of increased reactance of the lamp current limiting inductor.

The advantages reside in an excellent lamp power regulation, in a higher reliability and the lower sensitivity of the circuit to parameter fluctuations. In addition, it is also possible to permit larger component tolerances, and this leads to advantages in cost, in particular for the core of the lamp coil.

Another essential advantage of this high-frequency power generator is the ability to ignite and operate the electrodeless lamp in a wide temperature range, between −40° C. and +125° C.

The invention is explained below with the aid of an exemplary embodiment. The technical details additionally disclosed in the process can also be essential to the invention individually or in any desired combination.

BEST MODE FOR CARRYING OUT THE INVENTION

Figure 1:
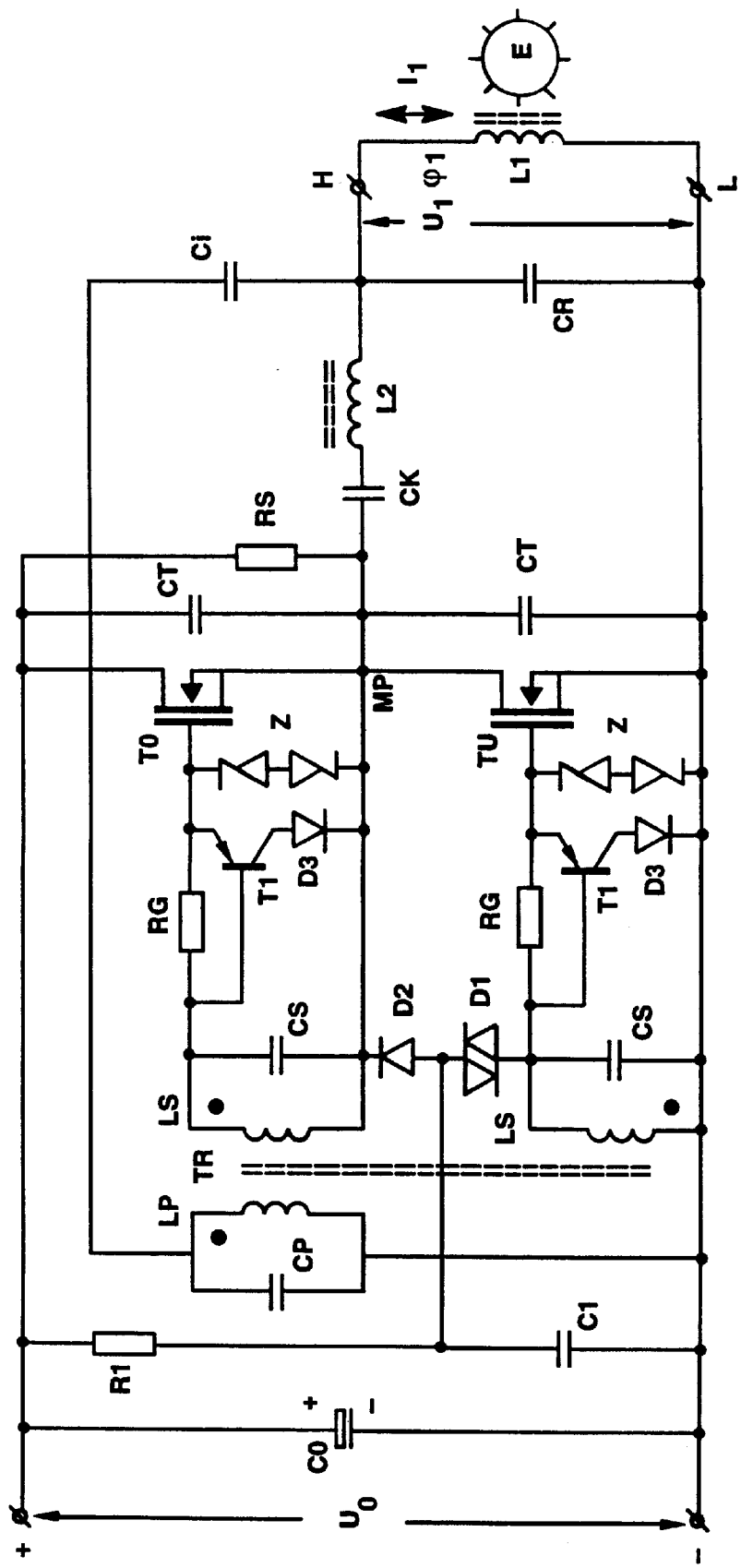
FIG. 1 shows a complete circuit diagram of the exemplary embodiment.

FIG. 1 shows an operating circuit according to the invention as part of an electronic ballast for an electrodeless low-pressure gas discharge lamp. Connected on the left at the input to the circuit is a rectified and regulated supply voltage $U_0$ which charges a storage electrolyte capacitor C0. The latter feeds a "Class D" half-bridge frequency generator having two MOS-FET switching elements TO and TU and the centre tap MP. The latter drives a series-parallel load circuit having a DC sweparating and RF coupling capacitor CK connected between the centre tap and the current-limiting and series resonant circuit coil (lamp inductor) L2, a series circuit resonance capacitor CR and, connected in parallel therewith, a lamp coil L1 with a coupling core and, as power output of the circuit, an electrodeless lowpressure gas discharge lamp E connected to the coupling core, specifically in the sequence enumerated and shown.

The lamp coil or resonance capacitor voltage $U_1$ (negative supply branch to earth) is connected by an injection capacitor Ci to the driver transformer, having a ferrite core TR, primary winding LP and two secondary windings LS. The black points in the circuit diagram correspond to the respective start of the windings of the transformer TR. It can be seen that the secondary windings are connected in opposition. The transformer excites two resonant circuits which in each case comprise the winding LS and the total gate capacitance CG of the MOS-FET TO or TU. The gate capacitance is transistor-specific, comes from technical and physical effects, and essentially contains the static input capacitance Ciss, as well as the dynamically variable Miller capacitance between gate and drain. AS said the driving transformer works in the linear B-H field, far away from the saturation region being excited by a small current coming from the lamp voltage through Ci.

A tuning capacitor CP is provided in parallel with the winding LP in order to tune the tapping branch of the drive circuit with the capacitor Ci and the winding LP; the resonant circuits likewise contain tuning capacitors CS in parallel with the windings LS for the purpose of MOS-FET gate drive. These tuning capacitors are smaller than the gate capacitance, and merely serve the purpose of fine tuning of the gate resonant frequency, these capacitors being determined by the other capacitances and inductances described.

The resistors RG, the depletion-mode transistors T1 and the diodes D3 in the drawing serve to improve the switching performance, particularly the switching-off losses. The protective Zener diodes Z connected in an anti-series fashion limit the gate voltage of the MOS-FETs during ignition of the lamp. The diagram also contains a conventional start circuit for a frequency generator in the form of the saw-tooth voltage generator which is formed from the components R1, C1, D2 and D1 (DIAC) and is turned off at the operating frequency by the diode D2 after the start-up. The resistor RS serves to prescribe a defined potential of the centre tap MP (loading the capacitor CK at positive supply potential) before the saw-tooth voltage generator described starts the power RF generator.

The capacitors CT are known as "trapezium capacitors" and limit the slope of the midpoint voltage i.e. of the potential of the centre tap MP of the alternating switching of the MOS-FETs TO and TU. In this way the switched voltage on MP has a slight trapezoidal shape.

The correct tuning of the resonant frequencies, and thus of the operating frequency, is important for designing the circuit. In the load circuit, the capacitors CK and CR and the inductors L2 and L1 determine an undamped resonant frequency $f_R$, whereas the capacitors CP, Ci and CS and the dynamic gate capacitors CG (not shown) and the inductances LP and LS in the drive circuit fix the driving resonant frequency $f_D$. The operating frequency $f_0$ of the whole system results as an intermediate value between $F_D$ and $f_R$, $f_R$ being hardly dependent on the lamp discharge resistance, i.e. on the lamp power. Since the operation of the circuit and the lamp requires the lamp to be operated as an inductive load, that is to say in a fashion with the lagging load current, the driving frequency $f_D$ is adjusted to be higher than the frequency $f_R$ so that the operating frequency $f_0$ is in any case above the resonant frequency of the load circuit. This applies both when the output circuit is unloaded (before ignition) and equally when it is loaded (after ignition).

In order to achieve a safe resonant operation of the power generator with sinusoidal load current and nearly sinusoidal lamp voltage, accomplishing an optimum efficiency (far above 95%), the frequencies $f_D$, $f_0$ and $f_R$ are in each case to differ, as said above, by only few per cent. Too small a difference, however, entails the risk of capacitive operation of the half-bridge, in particular during the start-up of the power generator, and this is not in fact desired.

Depending on the target operating frequency, the toroidal core of the transformer TR has to be designed with regard to the cross-sectional area so that it can operate with smallest possible flux density, and a core loss limit of approximately 0.3 $W/cm^3$ is as far as possible not exceeded.

The series-parallel configuration L1, L2, CK, CR of the load circuit essentially has the following properties: before ignition, the series-parallel configuration is essentially damped only by the core losses of the lamp coil L1, with the result that the resonant circuit, subjected to a low load, supplies a high voltage which is high enough for lamp ignition at every temperature. In this case, the magnetic core losses in the lamp coil L1, which increase approximately with the exponent of 2.5 of the voltage, have a fundamentally limiting effect. The generator behaves as a controlled voltage source. After exceeding the ignition voltage of the lamp, the parallel part of the load circuit (with L1) is loaded with the effective resistance RE of the plasma discharge, transformed by the winding ratio N of L1 ($R1=N^2 \cdot RE$), the operating frequency is increased, and the inductor L2 acts as a current-limiting lamp inductor, so that the generator, in turn, behaves as a controlled current source. In this case, stable operation presupposes that the total AC resistance of the generator current source (determined by L2) is always larger than the negative differential resistance of the lamp discharge characteristic.

Figure 2:
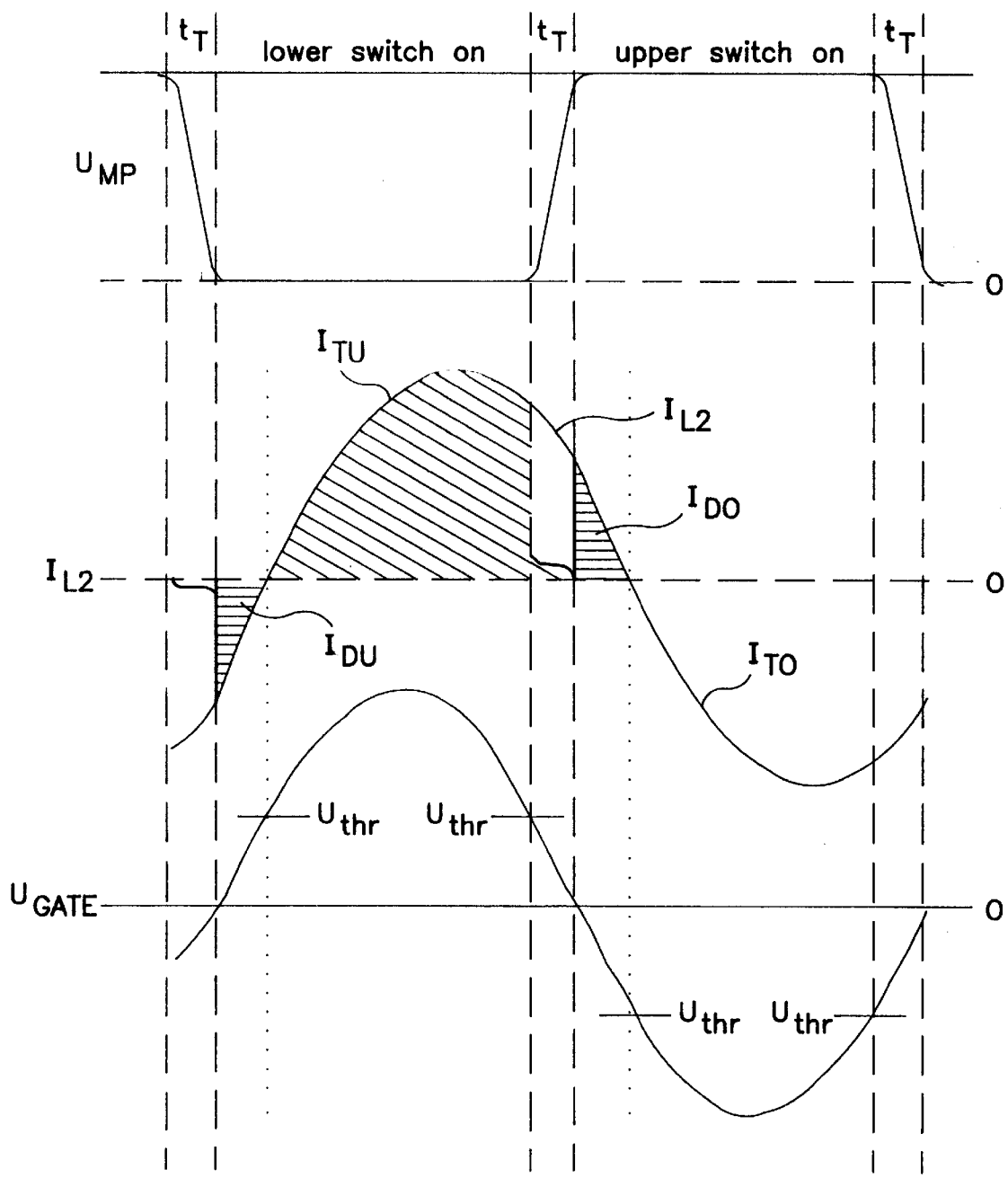
FIG. 2 shows a diagrammatic timing diagram for a better understanding of the mode of operation of the exemplary embodiment.

FIG. 2 shows diagrammatic curves of the time characteristics of the voltage $U_{MP}$ at the centre tap of the frequency generator, of the load circuit current $I_{L2}$ and of the gate voltage $U_{Gate}$ of the lower (n-channel) MOS-FET TU. The potential of the centre tap MP is alternately at that of the positive and that of the negative supply branch. In this case, the trapezium capacitors CT connected in parallel with the two MOS-FETs are decisive in producing specific transition times $t_T$. As is known, these are provided, on the one hand, to improve the electromagnetic compatibility and, on the other hand, to minimize the switching losses: a drain-source voltage which rises too quickly would overlap too strongly with the falling drain current, with a simultaneous current and voltage crossover, resulting in high turn-off power loss. Both functions of the trapezium capacitors, which can also be replaced by other circuit variants which operate analogously, are very important in the case of the increased operating frequencies of the circuit according to the invention.

The conduction state of a MOS-FET, which contains an inherent body diode, comprises, on the one hand, the phase which can be recognized in the lowest curve, in which the gate voltage is below the threshold voltage $U_{THR}$ of the MOS-FET and, on the other hand, the phase above the threshold voltage $U_{THR}$, in which the transistor is turned on. In this time domain, the load circuit current $I_{L2}$ flows in a fashion determined by the time constant $T=L2/R1$. The resonant filter effect of the arrangement, however, produces so strong a relative damping of the harmonics contained therein that the sinusoidal current fundamental wave illustrated in FIG. 2 essentially prevails.

The current flows inversely through the MOS-FETs before the zero line crossing and threshold voltage $U_{thr}$ is reached as freewheeling current through the so-called "body diode", of the MOS-PET and is denoted by $I_{DU}$ and $I_{DO}$, respectively, for the lower and upper transistors. The actual transistor current with the channel opened is denoted by $I_{TU}$ and $I_{TO}$, respectively, as seen in FIG. 2.

During the transition time $t_T$ no current flows in the MOS channel or body diode. The "missing piece" of the current, which is nearly sinusoidal overall, flows in the trapezium capacitors and the output capacitances Coss of the transistors.

It is essential in this case for the ability of the circuit to function that the transistor channel shall be made conductive, that is to say the threshold voltage $U_{thr}$ shall be reached, before the load current $I_{L2}$ changes the sign, coming from the body diode and flowing into the transistor channel, i.e., from drain to source.

When well designed, the circuit is suitable for ambient temperatures of −35° C. to +50° C. and component temperatures between −35° C. and +125° C., can be operated with DC or rectified supply voltages $U_0$ of between 50 V and 450 V, and can be designed for powers of between less than 20 W and more than 1000 W. The operating frequencies can be between 100 kHz and 3 MHz. The values specified correspond to the preliminary experimental results and are not to be understood as in any way restrictive.

For lower supply voltages (5 V . . . 50 V) a class E power generator according to the invention can also be implemented.

In the example illustrated, only a ferrite coupler (coil toroidal core) is indicated between a lamp coil $L_1$ and a lamp E. Ignition problems can occur at very high lamp powers (500–1000 W), and discharge uniformity problems can arise in the case of discharge geometries which are large or otherwise problematic. In such cases, a plurality of ferrite couplers, that is to say a plurality of lamp coils, can be used. Of course, it is also possible to conceive of a plurality of lamps which are fed from one power generator.

In the case of a plurality of lamp coils and ferrite couplers, it is possible in principle to use series circuit or parallel connections. However, the parallel connection is preferred, particularly in the case of high powers. The known rules of calculation for inductances, currents and voltages apply. The coupler inductances should be as equal as possible, in order to have a balanced power distribution.

It is also important to have as high as possible an inductance of the lamp coil L1, specifically in order to reduce the magnetizing current. It is necessary for this purpose to use a ferrite material with high permeability and slight variations both in the initial permeability and in the amplitude permeability, and to apply it with a minimum air gap and a high permeance factor. (It is chiefly the temperature dependencies of the permeability which can cause the load current detuning described at the beginning.)

The reduction in the magnetizing current of the ferrite coupler L1 has a very advantageous effect on the phase angle $\phi_1$ between the coupler voltage $U_1$ and the coupler current $I_1$, as illustrated in FIG. 1. In the case of a small phase angle $\phi_1$, $\cos \phi_1$ is large and the effective power $P_1 = U_1 I_1 \cos \phi_1$, which is coupled into the discharge, is high. It is to be seen in this case that the current $I_1$ can be reduced increasing the lamp coil turns number and voltage $V_1$ for a specific power $P_1$ if $\phi_1$ is between 15 to 20°, and consequently $\cos \phi_1$ is greater than 0.93. The smaller current $I_1$ determines a smaller load current $I_{L2}$; smaller currents in the entire power generator produce smaller losses and a higher efficiency of the entire system, ballast, generator and coupler.

The magnetic material of the coupler should be selected such that no specific losses of more than 60 mW/cm³ occur in the target frequency range at the core temperatures to be expected (approximately 100–120° C.). A closed magnetic circuit of high inductance but low leakage inductance benefits the radio interference suppression and the reduction in the apparent power of the system.

The result of the said specific ferrite losses, a suitable selection of the coupler coil and the output values $U_1$, $I_1$, and $\cos \phi_1$ is a very high energy transfer efficiency of 98 to 99%, that is to say the losses in the ferrite coupler amount to only 1 to 2% of the total transmitted power.

What is claimed is:

1. A circuit for operating a low-pressure gas discharge lamp (E), having a load circuit (CK, CR, L1, L2) which applies radio-frequency power to the lamp, a frequency generator (C0, TO, TU) for operating the load circuit, and a drive circuit (Ci, CP, CS, LP, LS, TR) for driving the frequency generator, characterized in that the circuit is designed for operating an electrodeless low-pressure gas discharge lamp (E) and has a switching system which operates in a freewheeling fashion close to resonance and contains the load circuit with the lamp and the drive circuit, the load circuit (CK, CR, L1, L2) has a series resonant circuit (CK, CR, L2) and a branch which is connected in parallel with a part (CR) of the resonant circuit and has a coil (L1) which is applied to the lamp (E), the resonance capacitor (CR) forming a parallel resonant circuit (L1, CR) with the coil (L1) and belonging to both resonant circuits.

2. The circuit according to claim 1 wherein the frequency generator operates at frequencies above 70 kHz.

3. The circuit according to claim 1 wherein the drive circuit (Ci, CP, CS, LP, LS, TR) is designed to generate by resonance the voltage required to drive at least one gate of a field-effect transistor (TO, TU) of the frequency power generator (C0, TO, TU).

4. The circuit according to claim 1 wherein the drive circuit (Ci, CP, CS, LP, LS, TR) has a transformer (LP, LS, TR) with a ferrite core (TR), which is designed to operate in the operating state in the linear B–H field at low flux density, that is to say in the non-saturation region.

5. The circuit according to claims 3 or 4 wherein the transformer (LP, LS, TR) is connected to a resonant circuit (LS, CS), in order to obtain the resonance voltage neccessary for efficient driving of one or more MOS-FET transistors.

6. The circuit according to claim 1 wherein the drive circuit (Ci, CP, CS, LP, LS, TR) has a device (Ci) which taps a current from the load circuit (CK, CR, L1, L2) and which is designed to supply the driver transformer with a nearly sinusoidal gate voltage.

7. The circuit according to claim 1 wherein the series resonant circuit (CK, CR, L2) contains a current-limiting coil (L2) which in the operating state essentially has the effect of being connected in parallel in terms of radio frequency with the coil (L1) applied to the lamp, the inductance of the current-limiting coil (L2) being smaller than that of the coil (L1) applied to the lamp.

8. The circuit according to claim 1 wherein the frequency generator (C0, TO, TU) is designed as a half-bridge, full-bridge or single-transistor (class E) frequency power generator.

* * * * *